Figure 1:
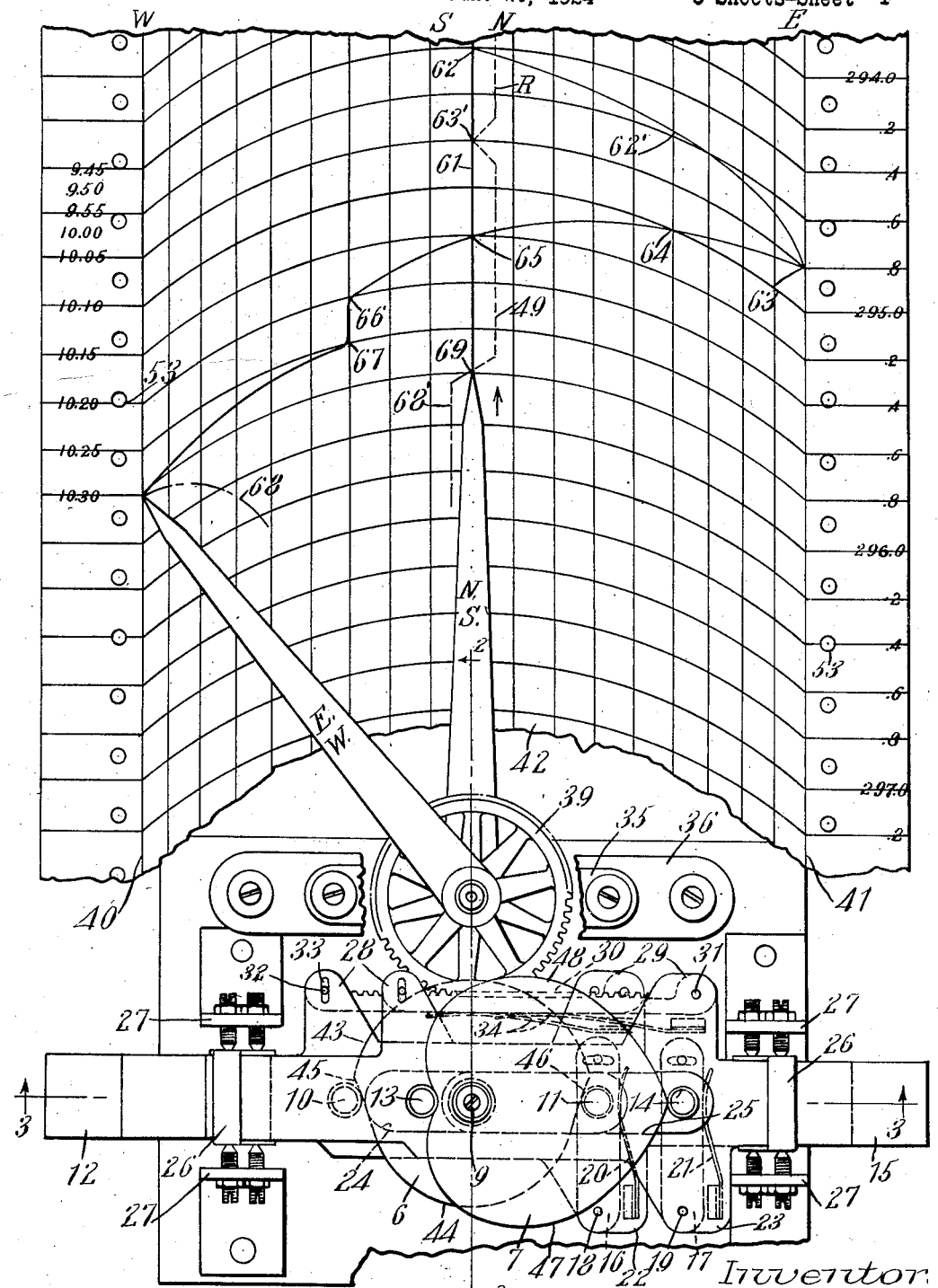

Dec. 10, 1929.  G. WALKER  1,738,808
DIRECTION RECORDER
Filed June 28, 1924  3 Sheets-Sheet 2

Inventor
George Walker
by Roberts Roberts & Cushman
Att'ys.

Dec. 10, 1929.   G. WALKER   1,738,808
DIRECTION RECORDER
Filed June 28, 1924   3 Sheets-Sheet 3
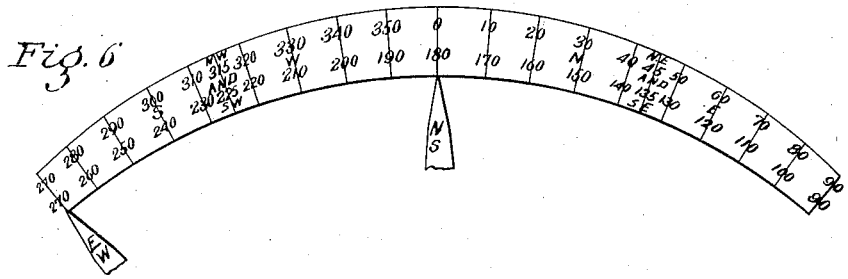
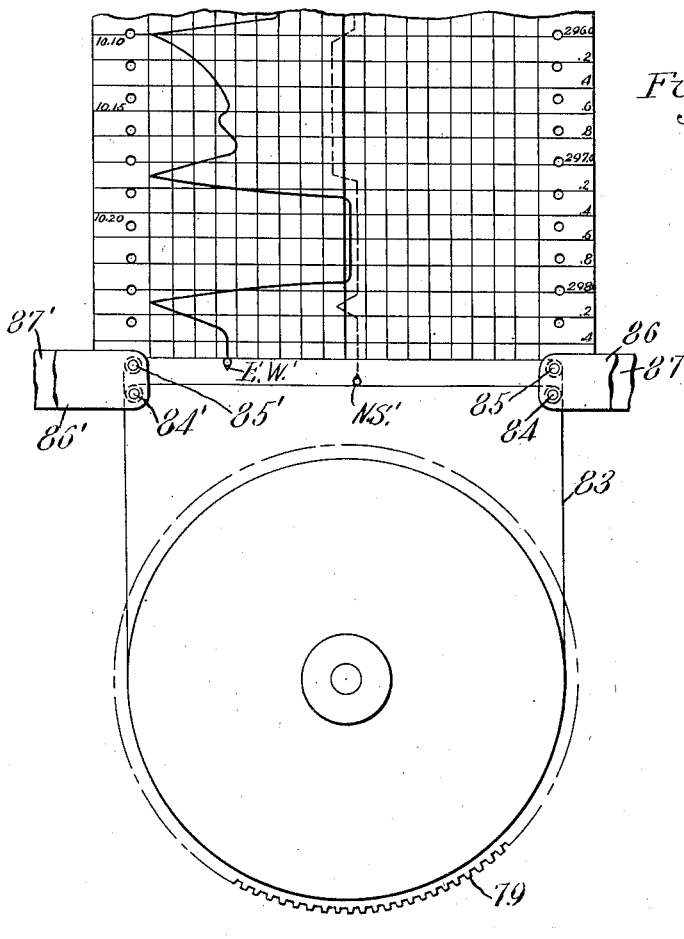
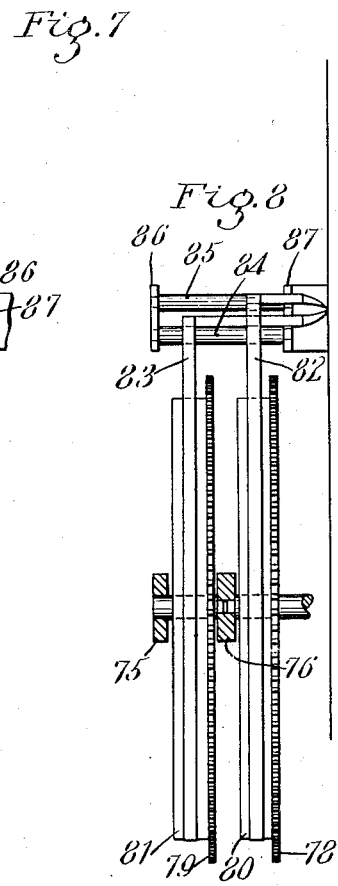
Inventor:
George Walker
by Roberts Roberts & Cushman
Att'ys.

Patented Dec. 10, 1929

1,738,808

UNITED STATES PATENT OFFICE

GEORGE WALKER, OF NEWTON CENTER, MASSACHUSETTS

DIRECTION RECORDER

Application filed June 28, 1924. Serial No. 722,943.

In prior application Ser. No. 614,839, filed January 25, 1923 is described a direction indicator and recorder for continuously recording the change in direction of a moving body, such as a ship, aircraft or land vehicle, or of a moving fluid medium, such as wind or water currents, and the present invention is an improvement upon the former apparatus.

In general the apparatus comprises a controller having unlimited angular movement, such as the shaft of a compass, repeater compass, weather vane or the like, in combination with an indicator or indicators oscillating to and fro, through predetermined arcs or along a straight line, by the controller, each indicator making one complete oscillation during each revolution of the controller. By employing two indicators so timed that one leads or trails the other by a quarter oscillation, one indicator moves through its central position while the other indicator reverses its movement at the end of its throw. Thus one indicator may be employed to indicate easterly or westerly directions depending upon its displacement to one side or the other of its central position while the other indicator indicates northerly or southerly orientation by its displacement relative to its central position. Thus the quadrant of the indicated direction is determined by the direction of displacement of the respective indicators from their central positions and the degree of orientation from a predetermined point of the compass is indicated by the extent of displacement of one or the other indicators from its central position or other predetermined position. With the indicators thus arranged changes in direction may be continuously recorded upon a ribbon of paper passing beneath the indicators transversely of the path of oscillation by providing the indicators with suitable marking means. By feeding the record strip at a rate proportional to the speed of the ship upon which the apparatus is carried, the course of the ship may be fully recorded. Elapsed time may also be printed at intervals upon the margin of the record strip. Suitable mechanisms for accomplishing these purposes are disclosed in the aforesaid application.

Objects of the present invention are to obtain greater simplicity and accuracy in the indicating or recording mechanism, to render the movement of the indicators or recorders smooth and easy, to eliminate lost motion in the mechanism for actuating the indicator or recorder, to make the recorded curve continuous and accurate, to render the record more readily readable, and generally to improve the art of recording directions.

For the purpose of illustrating the genus of the invention one concrete embodiment is shown in the accompanying drawings in which,—

Figure 2:
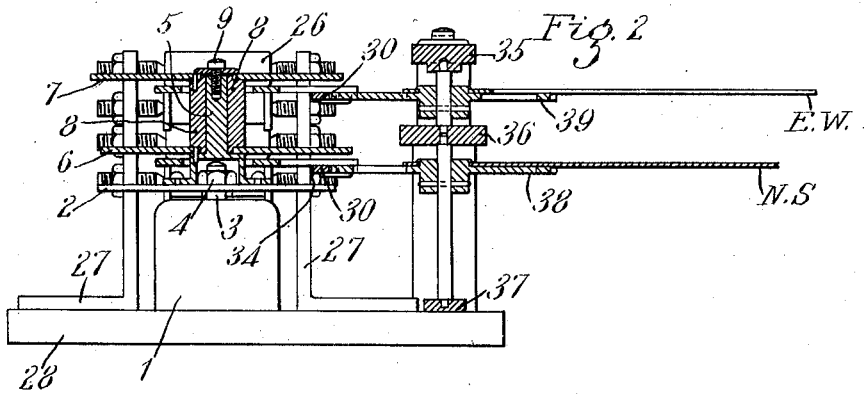
Figure 3:
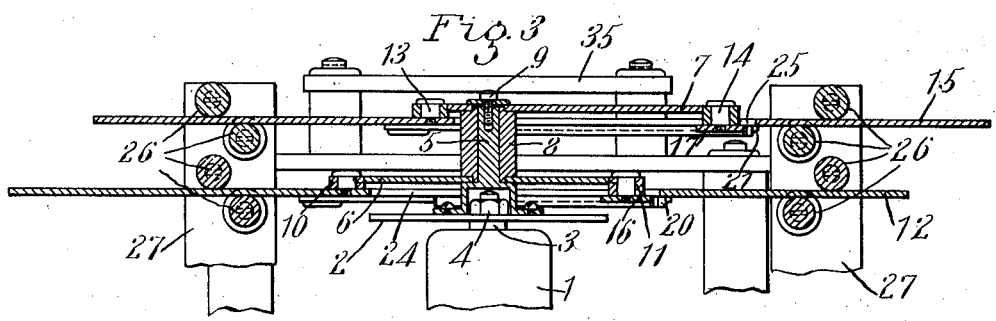
Figure 4:
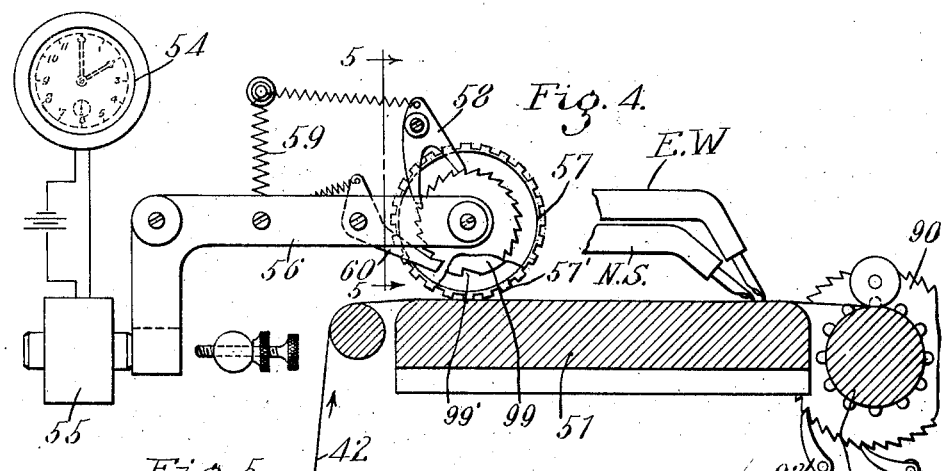
Figure 5:
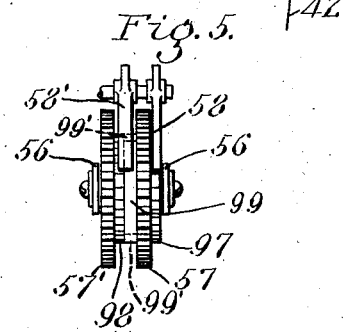

Fig. 1 is a plan view;
Fig. 2 is a section on line 2—2 of Fig. 1;
Fig. 3 is a section on line 3—3 of Fig. 1;
Fig. 4 is a side elevation showing the record platen and feed rolls in section;
Fig. 5 is a detail view showing the time markers viewed from line 5—5 of Fig. 4;
Fig. 6 is a detail view of a scale which may be used with the indicators, either with or without the recording sheet;
Fig. 7 is a plan view of a modification; and
Fig. 8 is a side view of the modification shown in Fig. 5.

In Figs. 2 and 3, 1 indicates a repeater compass of known construction having a circular table 2 fixedly mounted upon its rotatable shaft 3 by means of a nut 4. Resting upon table 2 is a vertical shaft 5 having a hollow hub on its lower end which receives nut 4 and is fast to the table 2 by means of screws. Fixedly attached to shaft 5 are two cams 6 and 7 which are separated by spacing sleeve 8 and clamped in position by screw 9. Cam 6 engages two rolls 10 and 11 on slide 12 and cam 7 engages two rolls 13 and 14 on slide 15. The rolls 11 and 14 are mounted on the slides respectively through arms 16 and 17 pivoted at 18 and 19 to lateral lugs 22 and 23 on the slides and pressed toward the cams by springs 20 and 21, these rollers extending through slots 24 and 25 in the slides. The slides are guided for endwise reciprocation by rolls 26 journaled in brackets 27 on base 28ª. Extending between lateral lugs 28 and 29 on each of the slides is a rack 30 which is pivoted to lug 29 at 31 and carries a pin 32 moving in slot 33 in lug 28. Springs 34 are mounted on lugs 29 to press the racks outwardly. Pivotally mounted in cross-pieces 35, 36 and 37 are two gear wheels 38 and 39 which mesh with the racks 30 and carry indicators EW and NS respectively. Springs 20 and 21 take up all lost motion between the cams and slides and springs 34 take up all lost motion between the racks 30 and gears 38 and 39.

As the shaft 5 is rotated by the repeater compass in either direction the slides 12 and 15 are reciprocated back and forth and the indicator EW oscillates back and forth between the marginal lines 40 and 41 on the record sheet 42, each slide and indicator EW making one complete oscillation for each rotation of shaft 5. Indicator NS will also oscillate between lines 40 and 41 (at one-quarter oscillation ahead or behind indicator EW) if cam 6 be shaped like cam 7. However, cam 6 is preferably modified by changing its opposite ends into concentric dwells 43 and 44, leaving only cam portions 45 and 46 corresponding to the opposite side portions 47 and 48 of cam 7, whereby indicator NS merely oscillates between the lines 49 and 68' of the record sheet.

The sheet 42 is fed over a suitable platen 51 (Fig. 4) in the direction of the arrows (Figs. 1 and 4) by means of a roller 52 having teeth engaging the holes 53 in the sheet. One of many ways of driving the sheet at a speed proportional to the speed of the ship comprises ratchet wheel 90, ratchet pawl 91 actuated by magnet 92, and pawl 93, the magnet 92 being recurrently energized by a circuit closer operating in synchronism with the ship speed (e. g. circuit closer 96 in my companion application filed on even date herewith now matured as Patent No. 1,638,973), whereby the sheet records the distance traveled by reference to distance markings shown at the right-hand side of the sheet in Fig. 1. By recording time markings at intervals, as shown at the left-hand side of the sheet in Fig. 1, the speed of the ship is also recorded. Suitable mechanism for making the time markings is shown in Fig. 4 where 54 is a control clock, 55 a magnet, 56 a bell-crank armature carrying counter markers 57 and 57' which are advanced by pawls 58 and 58' as the armature is raised by spring 59, pawls 58 and 58' and stop pawls 60 for the respective markers being mounted on stationary pivots. The marker 57 has twenty-four sets of numbers (00, 05, 10, 15, 20, 25, 30, 35, 40, 45, 50, 55, 00, 05, 10, 15, 20, 25, 30, 35, 40, 45, 50, 55) and is advanced one step every five minutes. The marker 57' has twenty-four sets of numbers (00 to 23 inclusive) and is advanced one step at each twelfth step of marker 57, that is once each hour, the pawl 58' being held out of contact with the ratchet wheel of marker 57' during eleven advances of marker 57 by cam wheel 99 and being permitted to engage its ratchet wheel on the twelfth advance of marker 57 by one of the two recesses 99' on the cam.

Displacement of indicators EW and NS to the right or left of the center line 61 indicates as follows: EW to the right, easterly; EW to the left, westerly: NS to the right, northerly; and NS to the left, southerly. Thus the positions of the two markers together indicate as follows: EW and NS to the right, northeasterly; EW to the right and NS to the left, southeasterly; EW to the left and NS to the left, southwesterly; and EW to the left and NS to the right, northwesterly. The degree of displacement of marker EW from the center line indicates the degree of deviation from the north-and-south line (east and west constituting 90° deviation) and the sheet is preferably ruled longitudinally at intervals corresponding to ten degrees deviation to facilitate the readings. The marks made by the respective markers are preferably different (one red and one black for example) so that the traces may be distinguished.

From the above it will be evident that the traces shown in Fig. 1 indicate the following course. Starting due north at 9.45 the ship swung to the starboard and at 9.55, after traveling 0.2 mile (294.6–294.4) was headed 50° east of north (see point 62', Fig. 1); and at 10.05, after traveling 0.2 mile farther, the ship was headed due east, as indicated by the trace B touching the marginal line 41 at 63 and the trace R touching the center line 61 at 63'. Up to this point the ship was traveling at the rate of 1.2 miles per hour and at this point the speed was increased to 2.4 miles per hour as will appear from a comparison of the time markings at the left of the sheet with the distance markings at the right of the sheet. Thence the ship swung to the port as indicated by trace R again extending to the right of center line 61 while trace B extends toward the center line. At 10.10 the ship was headed 50° east of north (see point 64) after traveling 0.2 mile farther, and at 10.15 due north again (see point 65). Thence the ship continued to turn to port until headed 30° west of north at 10.20 (see point 66) and then maintained this direction for 0.2 mile, again bearing to the port at 10.25 (see point 67). With the markers in the position shown in Fig. 1 the indicated direction is due west, marker EW being on the left-hand margin line 40 and the marker NS being on the center line 61. If the ship should continue to swing to the port the marker EW would swing toward the center line as indicated by the broken line 68 and the marker NS would move to the left of the center line as indicated by broken line 68'. Thus the marker NS is always on the center line when marker EW is on either marginal line 40 or 41. If the ship swings from east or west toward the north marker NS swings from the center line 61 to the right as at 63'; whereas if the ship swings from east or west toward the south, the marker NS swings from the center line to the left as indicated at 69.

In the modification shown in Figs. 7 and 8 gears 78 and 79 correspond to gears 38 and 39 in Figs. 1 to 3 and parts 75 and 76 correspond to parts 35 and 36. Instead of carrying markers EW and NS gears 78 and 79 actuate drums 80 and 81. Endless steel belts 82 and 83 extend around drums 80 and 81 and thence over rollers 84—84' and 85—85' journaled in brackets 86—86' and 87—87'. Belts 82 and 83 carry markers EW' and NS' which oscillate along straight lines instead of curved lines. Otherwise the operation of the modification is similar to that above described.

I claim:

1. A direction recorder comprising a controller having full circular movement in either direction in response to changes in direction, two indicators oscillating parallel to the same recording surface each of which oscillates in response to circular movement of said controller in either direction and connections between the controller and the indicators to move one indicator in response to any movement of the controller and to move the other indicator only when the first indicator is near an end of its oscillatory range.

2. A direction recorder comprising a controller having full circular movement in either direction in response to changes in direction, two indicators oscillating parallel to the same recording surface each of which oscillates in response to circular movement of said controller in either direction, one indicator having a wide range of oscillation and the other indicator having a limited range, and connections between the controller and the indicators to move the first indicator in response to any movement of the controller and to move the second indicator only when the first indicator is near an end of its range of oscillation.

3. A direction recorder comprising a controller having full circular movement in either direction in response to changes in direction, two indicators oscillating parallel to the same recording surface each of which oscillates in response to circular movement of said controller in either direction, one indicator having a limited range of oscillation to either side of the central position of the other indicator, and connections between the controller and the indicators to move the first indicator from one side to the other side of said central position at the instant the second indicator reverses its movement.

4. A direction recorder comprising oscillatory indicators, and means including rotary cams having endless surfaces for moving said indicators back and forth when rotated continuously in either direction, the cams being correlated to move one indicator across its central position while the other indicator is reversed at the end of its oscillation.

5. A direction recorder comprising a marker movable to and fro over a record sheet, means for actuating the marker including a slide movable transversely of the sheet, and a rotary cam having an endless surface for moving said slide back and forth in accordance with changes in direction, and a spring means having substantially constant tension for continuously taking up the lost motion between said cam and slide and marker.

6. A direction recorder comprising a marker movable to and fro over a record sheet, means for actuating the marker including a slide movable transversely of the sheet and a connection having lost motion between the slide and marker, and a rotary cam having an endless surface for moving said slide back and forth in accordance with changes in direction, a spring for taking up the lost motion between the cam and slide, and another spring for taking up the lost motion between the slide and marker.

7. A direction recorder comprising a marker movable to and fro over a record sheet, means for actuating the marker including a slide movable transversely of the sheet, a rotary cam having an endless surface for moving said slide back and forth in accordance with changes in direction, a cam follower mounted on said slide on one side of the axis of the cam, a second follower movably mounted on the slide on the opposite side of said axis, and a spring mounted on said slide to press said movable follower against the cam.

8. A direction recorder comprising a marker movable to and fro on a record sheet, means for actuating the marker including a slide movable back and forth transversely of the sheet in predetermined relation to changes in direction, a gear segment associated with the marker, a rack on the slide meshing with said segment, the rack being movable on the slide toward and from the segment, and a spring on the slide for holding the rack snugly in mesh with the segment.

9. A direction recorder comprising a pair of indicators movable to and fro, one of which moves to indicate the deviation of direction relative to a predetermined direction, means including a rotary cam having an endless surface for moving said indicator in accordance with changes in direction and a spring for continuously taking up lost motion between said cam and indicator, and the other indicator being movable to indicate the direction of movement relative to another predetermined line.

10. A direction recorder comprising one indicator which is movable to and fro, a rotary cam having an endless surface for moving said indicator in accordance with changes in direction and means connecting the cam and indicator to move the indicator back and forth through a complete cycle during each revolution of the cam, and another indicator movable from one position to another position when the direction is changed from one side of a predetermined directional line to the other side thereof.

11. A direction recorder comprising one indicator which is movable to and fro, a rotary cam having an endless surface for moving said indicator in accordance with changes in direction and means connecting the cam and indicator to move the indicator back and forth through a complete cycle during each revolution of the cam, and another indicator movable from one position to another position when the direction is changed from one side of a predetermined directional line to the other side thereof, said last named indicator being actuated by a cam having concentric dwells.

12. A direction recorder including two indicating means, one of said indicating means being movable to indicate deviation in direction relative to a predetermined direction and the other indicating a change in direction from one side of a predetermined line to the other, a rotary cam with concentric dwells controlling the last named indicating means.

13. A direction recorder, including two markers, one of said markers being movable to indicate the deviation in direction relative to a predetermined directional line, the other marker being movable from one position to indicate a direction at one side of another predetermined directional line to a second position to indicate a direction at the other side of the predetermined line.

14. Apparatus of the character described comprising a slide, a rack pivoted to the slide at one end, a guide on the slide for the other end of the rack, a gear engaging the rack intermediate its ends, and a spring on the slide pressing the rack against the gear.

15. Apparatus of the character described comprising parallel driving and driven shafts, a cam on the driving shaft, a slide slidable transversely of said shaft, a cam follower on the slide engaging said cam, guides for the slide on opposite sides of the driving shaft, a rack on the slide, a gear on the driven shaft meshing with said rack, and a spring on the slide pressing the rack against the gear.

16. Apparatus of the character described comprising parallel driving and driven shafts, a cam on the driving shaft, a slide slidable transversely of said shaft, a cam follower on the slide engaging said cam, guides for the slide on opposite sides of the driving shaft, a rack on said slide, and a gear on the driven shaft meshing with said rack.

17. Apparatus of the character described comprising parallel driving and driven shafts, a cam on the driving shaft, a slide slidable transversely of said shaft, a cam follower mounted on the slide on each side of the cam, the axis of one follower being fixed and the other movable relatively to the slide, a spring for holding the latter follower against the cam, a rack on the slide, and a gear on the driven shaft meshing with said rack.

18. Apparatus of the character described comprising a cam, a movable member having cam followers engaging opposite sides of the cam, the axis of one follower being fixed and the other movable relatively to said member, and a spring for holding the latter follower against the cam.

Signed by me at Boston, Massachusetts this third day of June 1924.

GEORGE WALKER.